United States Patent
Yano et al.

(10) Patent No.: US 11,982,582 B2
(45) Date of Patent: May 14, 2024

(54) OPTICAL FIBER CABLE AND WATER PRESSURE SENSING SYSTEM, AND SENSITIVITY CORRECTION METHOD

(71) Applicant: NEC Corporation, Tokyo (JP)

(72) Inventors: Yutaka Yano, Tokyo (JP); Eitaro Misumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 51 days.

(21) Appl. No.: 17/767,213

(22) PCT Filed: Aug. 25, 2020

(86) PCT No.: PCT/JP2020/031943
§ 371 (c)(1),
(2) Date: Apr. 7, 2022

(87) PCT Pub. No.: WO2021/075153
PCT Pub. Date: Apr. 22, 2021

(65) Prior Publication Data
US 2022/0373417 A1    Nov. 24, 2022

(30) Foreign Application Priority Data

Oct. 18, 2019  (JP) ................................ 2019-191493

(51) Int. Cl.
*G01L 11/02*    (2006.01)
(52) U.S. Cl.
CPC .................... *G01L 11/02* (2013.01)
(58) Field of Classification Search
USPC .................................................... 73/700–756
See application file for complete search history.

(56) References Cited

U.S. PATENT DOCUMENTS

| 4,927,232 A * | 5/1990 | Griffiths ................. G01L 1/245 |
| | | 250/227.24 |
| 5,026,141 A * | 6/1991 | Griffiths ................. G01B 11/18 |
| | | 385/13 |
| 7,289,907 B2 | 10/2007 | Meinig et al. |
| 10,488,537 B2 * | 11/2019 | Morris ................. G01V 1/3808 |
| 2011/0096321 A1 | 4/2011 | Roberts |

(Continued)

FOREIGN PATENT DOCUMENTS

| GB | 2273352 A * | 6/1994 | ............ G01M 3/047 |
| JP | 2586838 B | 3/1997 | |

(Continued)

OTHER PUBLICATIONS

International Search Report for PCT Application No. PCT/JP2020/031943, dated Oct. 6, 2020.

*Primary Examiner* — Andre J Allen

(57) ABSTRACT

An optical fiber cable (10) according to each of the present disclosures includes a long tube (11) and at least one optical fiber (12) held and passed through an inside of the tube (11). The tube (11) expands and contracts in a longitudinal direction when water pressure on an outside of the tube (11) changes. When the tube (11) expands and contracts in the longitudinal direction, the expansion and contraction of the tube (11) in the longitudinal direction is transmitted to the optical fiber (12) to expand and contract the optical fiber (12) in the longitudinal direction.

9 Claims, 12 Drawing Sheets

(56) References Cited

U.S. PATENT DOCUMENTS

| | | | |
|---|---|---|---|
| 2016/0187515 A1* | 6/2016 | De Jong | ............... G01L 11/025 |
| | | | 73/705 |
| 2016/0299026 A1* | 10/2016 | De Jong | ................. G01L 7/187 |
| 2017/0049341 A1 | 2/2017 | Karabacak et al. | |
| 2023/0073833 A1* | 3/2023 | Yano | ....................... G01L 11/02 |

FOREIGN PATENT DOCUMENTS

| JP | H11-230840 A | 8/1999 |
|---|---|---|
| JP | H11-248581 A | 9/1999 |
| JP | 2005-274200 A | 10/2005 |
| JP | 2008-175560 A | 7/2008 |
| JP | 2011-017652 A | 1/2011 |
| JP | 2017-519221 A | 7/2017 |

* cited by examiner

OPTICAL FIBER CABLE AND WATER PRESSURE SENSING SYSTEM, AND SENSITIVITY CORRECTION METHOD

This application is a National Stage Entry of PCT/JP2020/031943 filed on Aug. 25, 2020, which claims priority from Japanese Patent Application 2019-191493 filed on Oct. 18, 2019, the contents of all of which are incorporated herein by reference, in their entirety.

TECHNICAL FIELD

The present disclosure relates to an optical fiber cable that senses a change in water pressure and a water pressure sensing system, and a sensitivity correction method.

BACKGROUND ART

There is a need to observe various events that occur in the ocean, such as sea waves, tide levels, and tsunamis. As a technique for observing waves on the water surface, there is generally used an ultrasonic wave height meter or a GPS (Global Positioning System) wave meter. In addition, there is also generally used a method of observing changes in water pressure caused by waves on the seafloor with a water pressure sensor placed on the seafloor. This method is particularly effective for the purpose of detecting a tsunami offshore (Patent Literature 1). Further, there is also disclosed a technique for detecting, on land, how the undersea cable itself changes under the influence of water pressure (Patent Literature 2).

However, the technique for observing the above events using an ultrasonic wave height meter, a GPS wave meter, and a water pressure sensor placed on the seafloor need electrical wiring and involve an increase in apparatus size. Therefore, the apparatuses are not likely to be durable and they go with complicated maintenance, so that there is a problem of high cost.

In addition, the method of detecting the influence of the water pressure change on the undersea cable by assembling a long optical interferometer also requires a large number of long optical interferometers configured in order to know the water pressure change for each section of the undersea cable. This requires many core wires, and has a difficulty in economic efficiency.

On the other hand, an optical fiber sensing system that uses an optical fiber as a sensor allows inexpensive, easy, and wide-ranging sensing. Therefore, in recent years, various optical fiber sensing systems have been proposed.

For example, Patent Literature 3 discloses a technique in which the sensor medium used is an optical fiber bragg grating (hereinafter referred to as FBG) having a grating written in an optical fiber. According to the technique disclosed in Patent Literature 3, when a static water pressure is applied from the vertical direction of the outer peripheral surface of the FBG, the FBG extends in the longitudinal direction to extend the pitch of the diffraction grating. This FBG is a fiber laser resonator mirror, and the static water pressure is detected by using the fact that the laser oscillation wavelength changes when the FBG reflection wavelength changes.

Further, Patent Literature 4 discloses a technique for fixing an optical fiber inside a metal tube by using a fixing method of (narrowing) swaging. According to the technique disclosed in Patent Literature 4, the strain generated in the optical fiber is detected by using the Brillouin scattered light generated from the light incident in the optical fiber.

CITATION LIST

Patent Literature

[Patent Literature 1] U.S. Pat. No. 7,289,907
[Patent Literature 2] Japanese Patent No. 2586838
[Patent Literature 3] Japanese Unexamined Patent Application Publication No. H11-248581
[Patent Literature 4] Japanese Unexamined Patent Application Publication No. 2005-274200

SUMMARY OF INVENTION

Technical Problem

However, the technique disclosed in Patent Literature 3 requires the use of a special component called FBG for the optical fiber. Further, the technique disclosed in Patent Literature 4 requires the use of a special fixing method of (narrowing) swaging to fix the optical fiber inside the metal tube.

Therefore, the techniques disclosed in Patent Literatures 3 and 4 do not have the advantage that the optical fiber cable functions as a sensor as it is, which is one of the merits of the optical fiber sensing system. This brings a problem of difficulty in sensing in a wide range and in a distributed manner along the cable inexpensively and easily.

Therefore, an object of the present disclosure is to provide an optical fiber cable and a water pressure sensing system, and a sensitivity correction method that can solve the above-described problems and can easily and inexpensively sense a change in water pressure using an optical fiber.

Solution to Problem

An optical fiber cable according to one aspect includes:
a long tube; and
at least one optical fiber held and passed through an inside of the tube, in which
the tube is structured to expand and contract in a longitudinal direction when a water pressure on an outside of the tube changes, and
the optical fiber is structured to expand and contract in the longitudinal direction according to expansion and contraction of the tube, in the longitudinal direction, transmitted from the tube when the tube expands and contracts in the longitudinal direction.

A sensitivity correction method according to another aspect includes:
calculating sensitivity coefficients at a plurality of points of the optical fiber cable, based on continuity when waves pass, from measured value data, the waves being waves of change in water pressure at a bottom of the water or waves of an earthquake propagating on a seafloor ground, the change in water pressure being caused by water surface waves above the optical fiber cable, the data recording how the waves pass through the optical fiber cable in a longitudinal direction;
performing a step of calculating the sensitivity coefficients a plurality of times under a plurality of conditions in which the waves has different traveling directions and ways of ruffle;

connecting the sensitivity coefficients obtained at the respective points to minimize mismatching over an entire observation area of the optical fiber cable, and averaging the sensitivity coefficients obtained a plurality of times;

determining thus obtained sensitivity coefficients to be sensitivity calibration coefficients for the respective points of the optical fiber cable; and, in subsequent measurements, dividing measured values obtained at the respective points on the optical fiber cable by the sensitivity calibration coefficients, and thereby correcting sensitivity non-uniformity at the respective points on the optical fiber cable.

A water pressure sensing system according to yet another aspect includes:

an optical fiber cable according to the above;

a receiving unit configured to emit incident light into the optical fiber of the optical fiber cable and receive back scattered light generated at a plurality of points on the optical fiber; and a detection unit configured to detect states of expansion and contraction of the respective points, based on patterns of the back scattered light, on the optical fiber in a longitudinal direction, and thereby detect a distribution of water pressure and a time variation of water pressure on an outside of the tube.

Advantageous Effects of Invention

According to the above aspect, it is possible to obtain an effect that can inexpensively and easily provide an optical fiber cable and a water pressure sensing system, and a sensitivity correction method capable of sensing a water pressure change using an optical fiber.

DESCRIPTION OF EMBODIMENTS

Figure 1:
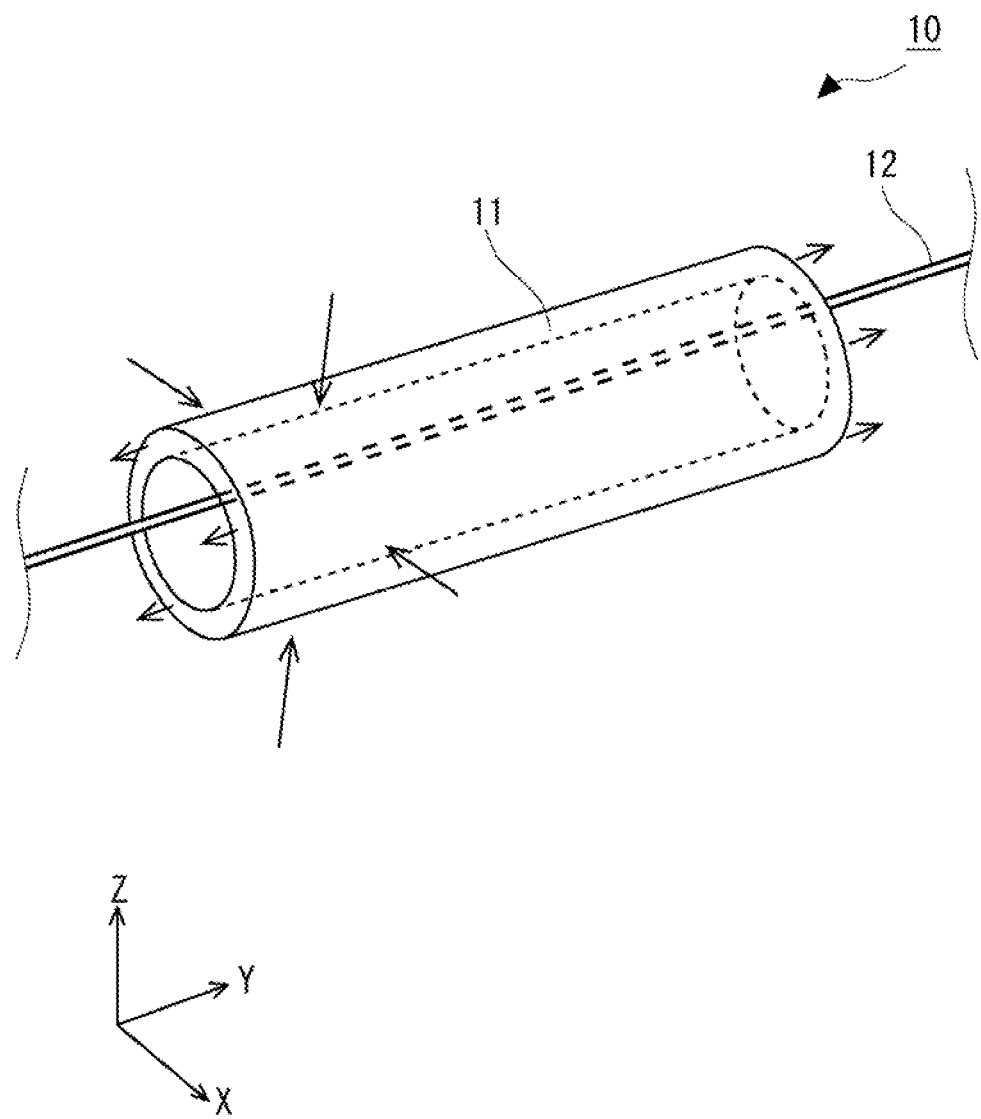
FIG. 1 is an external perspective view showing a configuration example of an optical fiber cable according to an example embodiment.

The following describes example embodiments of the present disclosure with reference to drawings. The following descriptions and drawings have parts omitted or simplified as appropriate for the sake of clarification of the explanation. Further, in each of the following drawings, the same elements are designated by the same reference numerals, and duplicate explanations thereof are omitted as necessary.

Example Embodiment

Optical Fiber Cable

First, a configuration example of the optical fiber cable 10 according to this example embodiment is described with reference to FIG. 1. The optical fiber cable 10 according to this example embodiment is laid in water areas such as the sea, rivers, lakes and marshes, and dams.

As shown in FIG. 1, the optical fiber cable 10 according to this example embodiment includes a long tube 11 and an optical fiber 12 held and passed through the inside of the tube 11. The optical fiber cable 10 is provided with one optical fiber 12 in FIG. 1, and an optical fiber cable 10 is provided with at least one optical fiber 12.

There are two possible mechanisms for the tube 11 to expand and contract in the longitudinal direction when the water pressure on the outside of the tube 11 changes.

The first mechanism is that when the water pressure on the outside of the tube 11 changes, the tube 11 expands and contracts in the radial direction and at the same time expands and contracts in the longitudinal direction. In other words, the tube 11 is structured in which the tube 11 does not crush, and expands and contracts in the longitudinal direction if the water pressure on the outside of the tube 11 changes. As the water pressure on the outside of the tube 11 increases, the tube 11 compresses in the radial direction and at the same time extends in the longitudinal direction. Since the water pressure corresponding to the average water depth is constantly applied to the bottom of the water, the tube 11 is always in a state of extending to some extent in the longitudinal direction. Therefore, when the water pressure on the outside of the tube 11 reduces, the tube 11 deforms and restores so as to expand in the radial direction and at the same time contract in the longitudinal direction.

Figure 2:
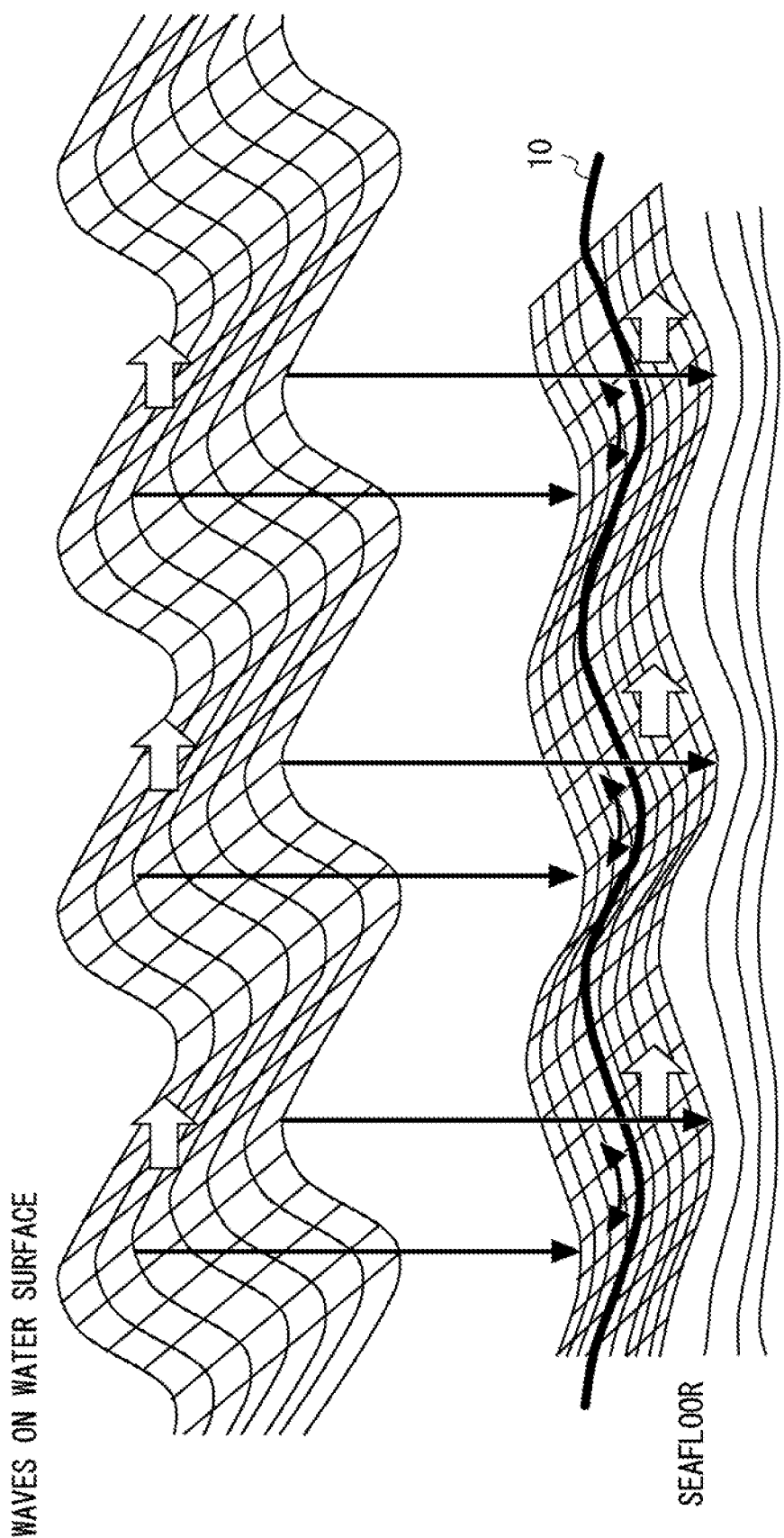
FIG. 2 is an explanatory diagram showing how a change in water pressure, due to travel of water surface waves, travels while deforming a bottom surface of water.

As shown in FIG. 2, the second mechanism is that: the seafloor ground is pushed by water pressure and elastically deforms; and this elastic deformation of the seafloor also moves according to the movement of locations of high and low water pressure due to travel of water surface waves. Since the optical fiber cable 10 is laid on or laid under the seafloor, deformation of the seafloor ground expands and contracts the optical fiber cable 10 in the longitudinal direction. For this mechanism to work, friction is required between the optical fiber cable 10 and the seafloor ground. In particular, the optical fiber cable 10, which is laid under the seafloor, is likely to deform in conjunction with the elastic deformation of the seafloor ground. When the optical fiber cable 10 expands and contracts, the tube 11 therein also expands and contracts in conjunction with the expansion and contraction. Therefore, what causes the expansion and contraction of the optical fiber 12 thereafter is the same as the first mechanism.

Actually, it is considered that these two are mixed in the mechanism in which the change in water pressure causes the expansion and contraction of the optical fiber 12.

The amount of expansion and contraction of the optical fiber 12 described here is extremely small, but it is a sufficiently detectable amount when viewed based on the wavelength (typically about 1 μm) in the optical fiber 12 of the light used for measurement. The tube 11 has a pressure-resistant structure that prevents the water pressure on the outside of the tube 11 from directly becoming the lateral pressure of the optical fiber 12.

Further, the tube 11 is, a tubular structure made of, for example, a metal tube. Here, the tubular structure does not necessarily need to be a seamless integral structure, and may be formed by combining a plurality of members.

The optical fiber 12 has a structure in which, when the tube 11 expands and contracts in the longitudinal direction, the expansion and contraction of the tube 11 in the longitudinal direction is transmitted so that the optical fiber 12 expands and contracts in the longitudinal direction.

The following describes some examples of the arrangement relationship between the tube 11 and the optical fiber 12 with reference to FIGS. 3 to 6.

Figure 3:
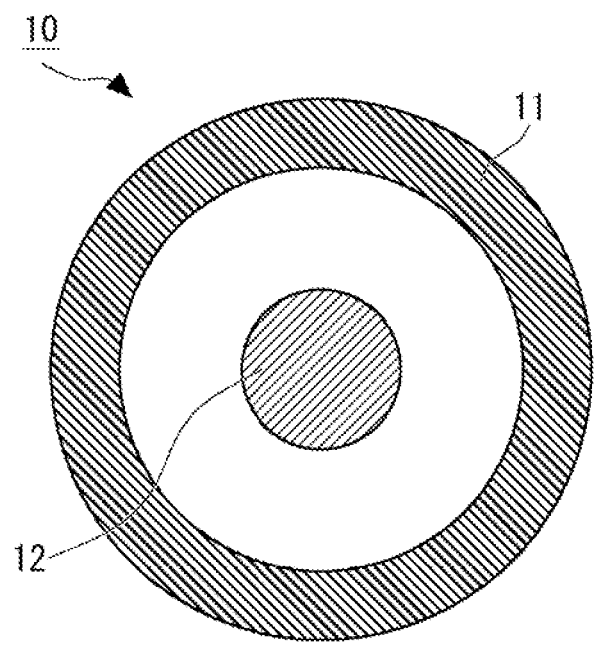
FIG. 3 is a cross-sectional view showing a configuration example of an optical fiber cable according to an example embodiment.
Figure 3:
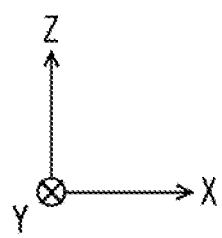

In the example of FIG. 3, the optical fiber 12 has an outer diameter smaller than the inner diameter of the tube 11 and is arranged near the substantially center of the tube 11. Further, a gap is formed between the tube 11 and the optical fiber 12. In the case of FIG. 3, if the tube 11 has a bend part, the optical fiber 12 comes into contact with the inner wall of the tube 11 at the bend part, so that friction occurs. Therefore, the optical fiber 12 expands and contracts in the longitudinal direction in conjunction with the expansion and contraction of the tube 11 in the longitudinal direction.

Figure 4:
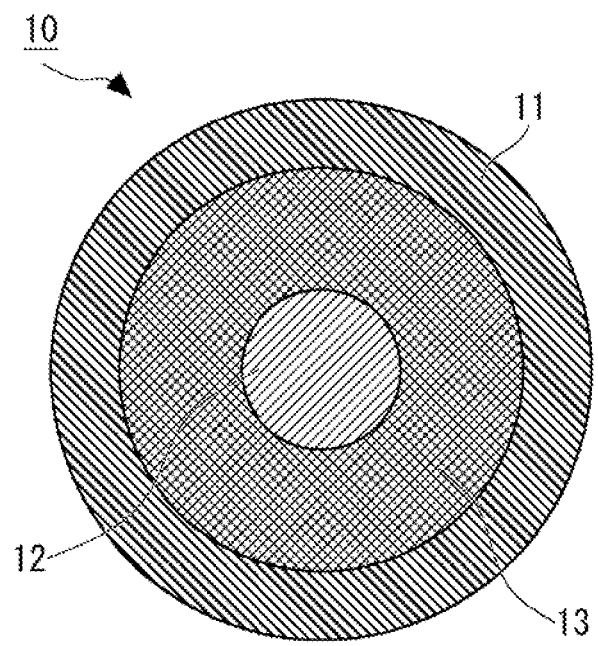
FIG. 4 is a cross-sectional view showing a configuration example of an optical fiber cable according to an example embodiment.
Figure 4:
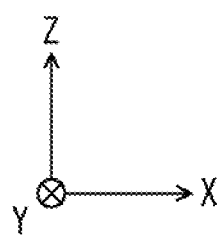

In the example of FIG. 4, a filler 13 is filled in the gap part of FIG. 3. When the filler 13 in FIG. 4 is a gel, the friction between the tube 11 and the filler 13 is reduced due to the lubricity of the gel. However, if the tube 11 extends by water pressure, the optical fiber 12 extends because friction with the tube 11 necessarily occurs somewhere. Therefore, the optical fiber 12 expands and contracts in the longitudinal direction in conjunction with the expansion and contraction of the tube 11 in the longitudinal direction. If the filling rate of the filler 13 is 100%, the contraction of the inner diameter of the tube 11 due to the external pressure may directly transmit the pressure to the optical fiber 12 to generate a lateral pressure that is harmful. Therefore, the filling rate of the filler 13 is generally set to less than 100% to leave a little air. Even in that case, there still obtained an effect in which the tube 11 and the optical fiber 12 expand and contract in conjunction with each other.

Further, when the filler 13 in FIG. 4 is a resin, the optical fiber 12 and the filler 13 are integrated, which generates a large friction between the tube 11 and the filler 13. Therefore, the expansion and contraction of the tube 11 in the longitudinal direction is more likely to be in conjunction with the expansion and contraction of the optical fiber 12 in the longitudinal direction.

Figure 5:
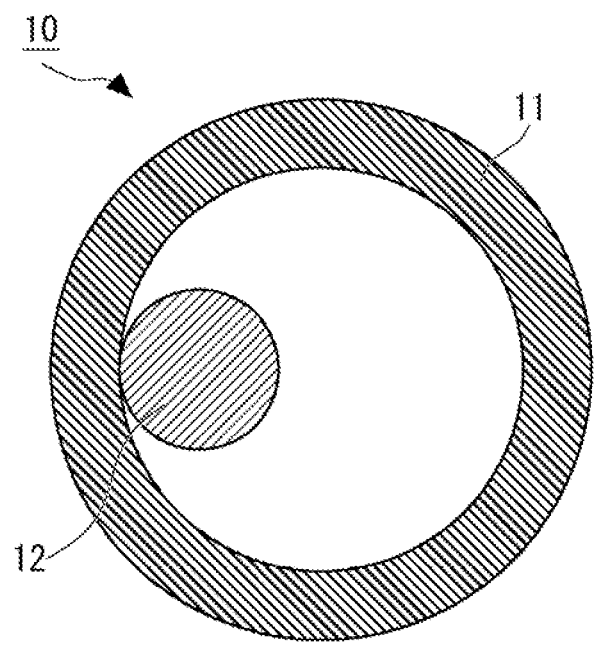
FIG. 5 is a cross-sectional view showing a configuration example of an optical fiber cable according to an example embodiment.

In the example of FIG. 5, the optical fiber 12 has an outer diameter smaller than the inner diameter of the tube 11, and the optical fiber 12 is in contact with the inner wall of the tube 11. Therefore, in the case of FIG. 5, the optical fiber 12 expands and contracts in the longitudinal direction in conjunction with the expansion and contraction of the tube 11 in the longitudinal direction. In the case of FIG. 5, the optical fiber 12 does not need to be in contact with the inner wall of the tube 11 over the entire length in the longitudinal direction, and need to have at least a part in contact with the inner wall of the tube 11. Further, in the case of FIG. 5, at the point where the optical fiber 12 comes into contact with the inner wall of the tube 11, the optical fiber 12 may be fixed to the inner wall of the tube 11 by using an adhesive or the like. Further, in the case of FIG. 5, the optical fiber 12 expands and contracts in the longitudinal direction in conjunction with the expansion and contraction of the tube 11 in the longitudinal direction regardless of the presence or absence of the filler. Therefore, a gap may be formed between the tube 11 and the optical fiber 12 as shown in FIG. 5, or a filler may be filled there.

Figure 6:
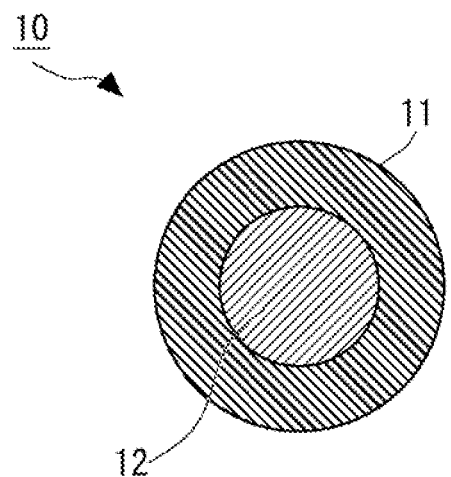
FIG. 6 is a cross-sectional view showing a configuration example of an optical fiber cable according to an example embodiment.
Figure 6:
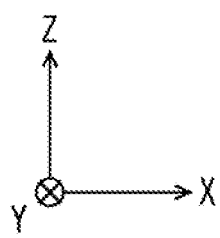

In the example of FIG. 6, the optical fiber 12 has an outer diameter substantially the same as the inner diameter of the tube 11, and the optical fiber 12 is in close contact with the inner wall of the tube 11. Therefore, in the case of FIG. 6, the optical fiber 12 expands and contracts in the longitudinal direction in conjunction with the expansion and contraction of the tube 11 in the longitudinal direction. In this configuration, the external pressure tends to be the lateral pressure of the optical fiber 12, but such a simple configuration can be applied as long as the lateral pressure does not cause a problem in the use and life of the optical fiber 12.

Water Pressure Sensing System

Figure 7:
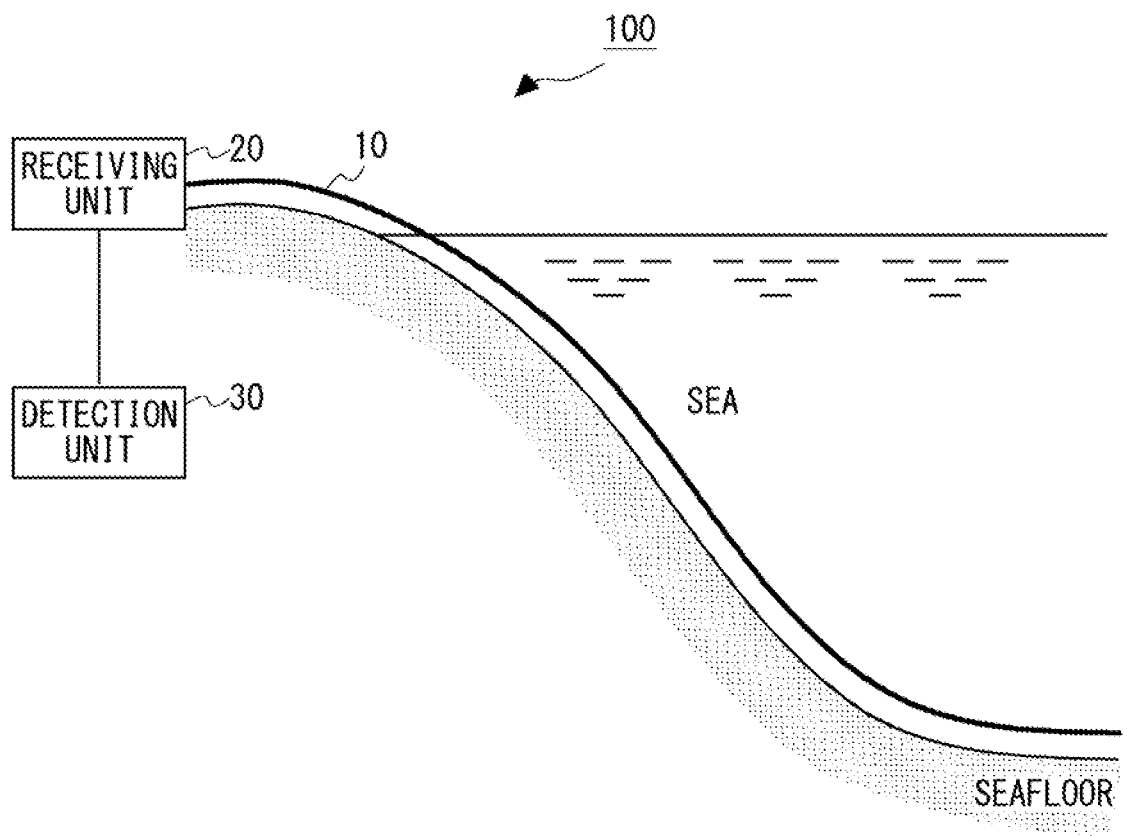
FIG. 7 is a diagram showing a configuration example of a water pressure sensing system according to an example embodiment.

The following describes a configuration example of a water pressure sensing system according to this example embodiment with reference to FIG. 7. Note that FIG. 7 is an example in which the optical fiber cable 10 is laid in the sea as an undersea cable.

As shown in FIG. 7, the water pressure sensing system 100 according to this example embodiment includes the above-mentioned optical fiber cable 10, a receiving unit 20, and a detection unit 30.

The optical fiber cable 10 is laid in the sea as an undersea cable connecting continents, for example. Therefore, the optical fiber cable 10 extends from the beach toward the offshore.

The optical fiber cable 10 has the above-mentioned structure. In other words, when the water pressure on the outside of the tube 11 changes, the tube 11 expands and contracts in the longitudinal direction. The expansion and contraction in the longitudinal direction of the tube 11 is transmitted to the optical fiber 12, so that the optical fiber 12 expands and contracts in the longitudinal direction.

Further, the optical fiber cable 10 is laid on the seafloor or laid under the seafloor. When the water pressure near the seafloor changes due to changes in water depth or the like, the seafloor deforms slightly accordingly. The friction between the seafloor and the optical fiber cable 10 causes longitudinal expansion and contraction of the optical fiber cable 10, which is transmitted to the optical fiber 12.

Therefore, detecting the state of longitudinal expansion and contraction of the optical fiber 12 allows detecting the change in the water pressure on the outside of the tube 11. At this time, detecting the states of longitudinal expansion and contraction of a plurality of points on the optical fiber 12 allows detecting the distribution of the water pressure and the time variation of the water pressure on the outside of the tube 11.

The receiving unit 20 emits pulsed light into the optical fiber 12 configuring the optical fiber cable 10 as incident light. Further, the receiving unit 20 receives back scattered light generated at the respective points on the optical fiber 12 as the pulsed light is transmitted through the optical fiber 12.

For example, based on the time difference between the time when the receiving unit 20 emits the pulsed light into the optical fiber 12 and the time when the receiving unit 20 receives the back scattered light from the optical fiber 12, the detection unit 30 identifies the position on the optical fiber 12 where the back scattered light is generated (the cable length of the optical fiber cable 10 from the receiving unit 20). Then, the detection unit 30 detects a state of longitudinal expansion and contraction of the respective points on the optical fiber 12 based on the back scattered light generated at the respective points on the optical fiber 12.

Here, when a point on the optical fiber 12 expands and contracts in the longitudinal direction, the strain amount of the optical fiber 12 also changes at the point. This change in the strain amount appears as a change in the frequency shift amount of the Brillouin scattered light among the back scattered light generated at the point. Therefore, the following is possible: precisely measuring the frequency of Brillouin scattered light as in Patent Literature 4; detecting the change in the strain amount at respective points on the optical fiber 12; and, based on the detection result, detecting the state of longitudinal expansion and contraction at the respective points on the optical fiber 12.

However, Brillouin scattered light has a weaker return light power than the Rayleigh scattered light and a minute change in the frequency shift amount. Therefore, when Brillouin scattered light is used, it is necessary to detect a minute frequency change of weak Brillouin scattered light, which is technically difficult. The attenuation in the optical fiber 12 makes it difficult to measure in a long distance. In addition, highly accurate detection requires averaging the measured values many times, which then requires a relatively long measurement time.

On the other hand, in this example embodiment, the detection unit 30 measures the Rayleigh scattered light generated at the respective points on the optical fiber 12. This allows measurement in a relatively long distance and in a relatively short time with sufficient accuracy.

As described above, the detection unit 30 detects the states of longitudinal expansion and contraction at the respective points on the optical fiber 12, and thereby detects the distribution of water pressure on the outside of the tube 11 and the time variation of water pressure.

The phenomenon of longitudinal expansion and contraction of the optical fiber 12 modulates Rayleigh back scattered light. Suitable techniques for detecting the modulated Rayleigh scattered light include DAS (Distributed Acoustic Sensor) or DVS (Distributed Vibration Sensor).

Both DAS and DVS are techniques for detecting how the optical fiber expands and contracts locally and the Rayleigh scattering point moves locally in the form of phase modulation to Rayleigh back scattered light.

In this example embodiment, description on DAS and DVS are such that they respectively have the following means for detecting the phase change of Rayleigh scattered light. Coherent detection is used in DAS. In other word, the DAS causes the Rayleigh scattered return light and typically the local emission to interfere with each other to detect the phase rotation of the Rayleigh back scattered light. On the other hand, DVS detects the instantaneous power of Rayleigh scattered return light. The DVS detects the intensity modulation of the phase modulated Rayleigh scattered light in the optical fiber 12 because the phase-modulated Rayleigh scattered light goes through multiple interferes and is naturally converted into the intensity modulated light. Although DVS is slightly inferior to DAS in sensitivity stability and input-output linearity, DVS has advantages of simple configuration and easy cost reduction.

Figure 8:
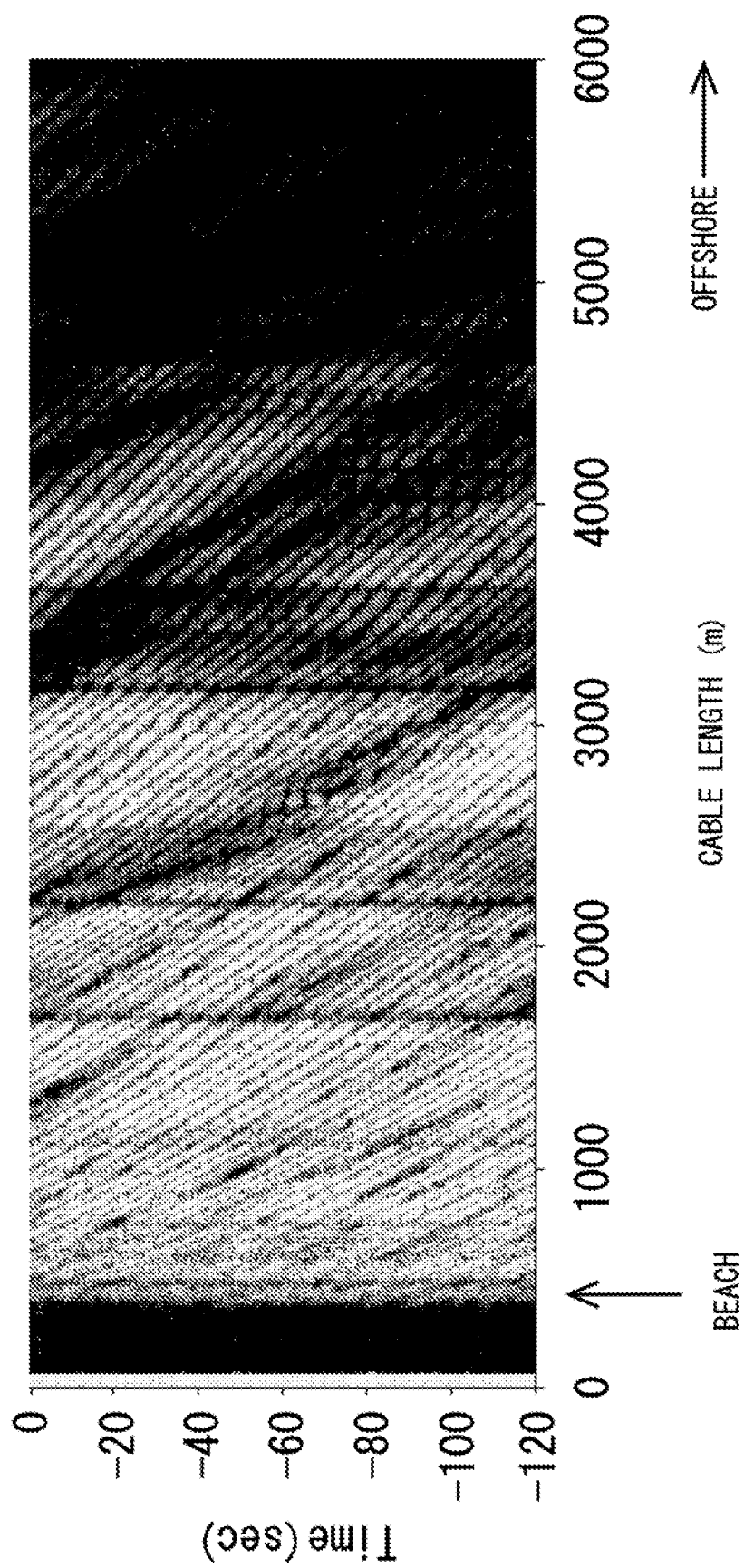
FIG. 8 is a diagram showing an example in which a change in water pressure due to waves is detected.
Figure 9:
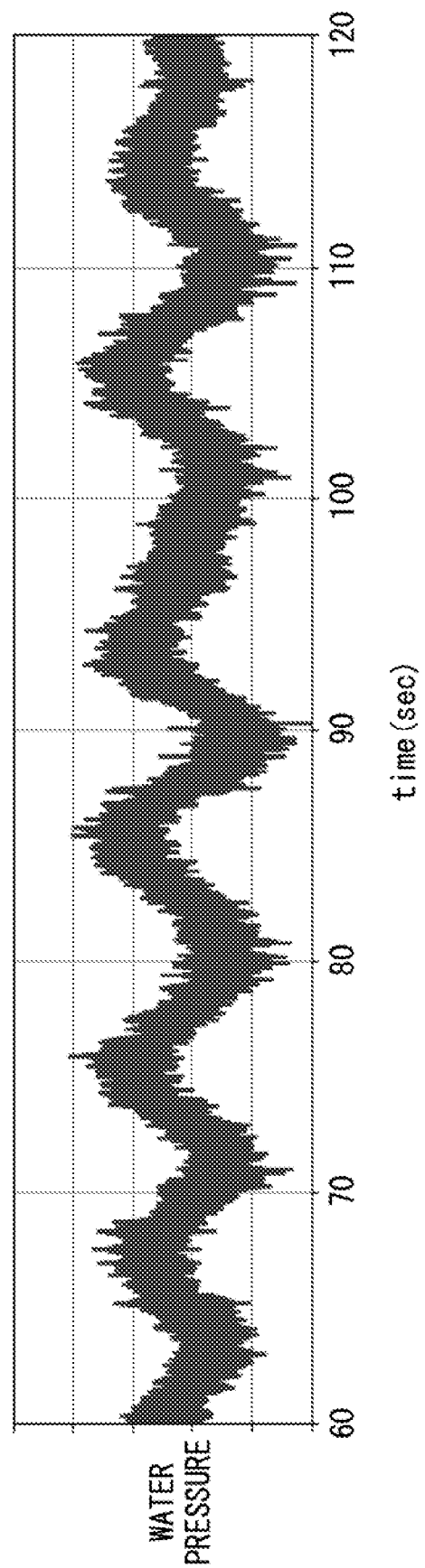
FIG. 9 is an explanatory diagram showing a change in water pressure at a point of 2.6 km in FIG. 8 in a two-dimensional graph.

The following describes, as an example, a state of using DAS for the detection unit 30 to detect a distribution of water pressure around the optical fiber cable 10 and a time variation of water pressure with reference to FIGS. 8 and 9.

FIG. 8 is an example of observing a change in water pressure in the range where the cable length of the optical fiber cable 10 from the receiving unit 20 is up to 6 km. The water depth 6 km offshore is 120 m, which is a shallow coast.

The detection unit 30 uses DAS to acquire a pattern of Rayleigh scattered light showing the state of expansion and contraction generated at the respective points on the optical fiber 12 due to the change in water pressure, and thereby obtains the result of the water pressure change shown in FIG. 8.

In FIG. 8, the horizontal axis indicates the cable length [m] of the optical fiber cable 10 from the receiving unit 20, in which the left side is the beach and the right side is offshore. The vertical axis indicates the time [sec] in which the time elapses toward the top, and indicates the result of about 2 minutes. The shade of color indicates the height of the water pressure, in a unipolar manner, sensed by the cable. The brighter the color, the higher the water pressure.

In FIG. 8, the heights of the water surface waves propagating in the observation range are represented by light and dark. The positive and negative of the slopes of the line indicating the water surface waves indicate the direction of the water surface waves, and a negative slope indicates that the water surface wave is heading toward the beach. Further, the magnitude of the slope of the line indicating a water surface wave indicates the velocity of the water surface wave. The larger the slope, the slower the velocity.

Therefore, from FIG. 8, it can be seen that as the water surface waves approach the beach from offshore, that is, as the water depth is shallower, the velocity of the water surface waves are slower.

Figure 10:
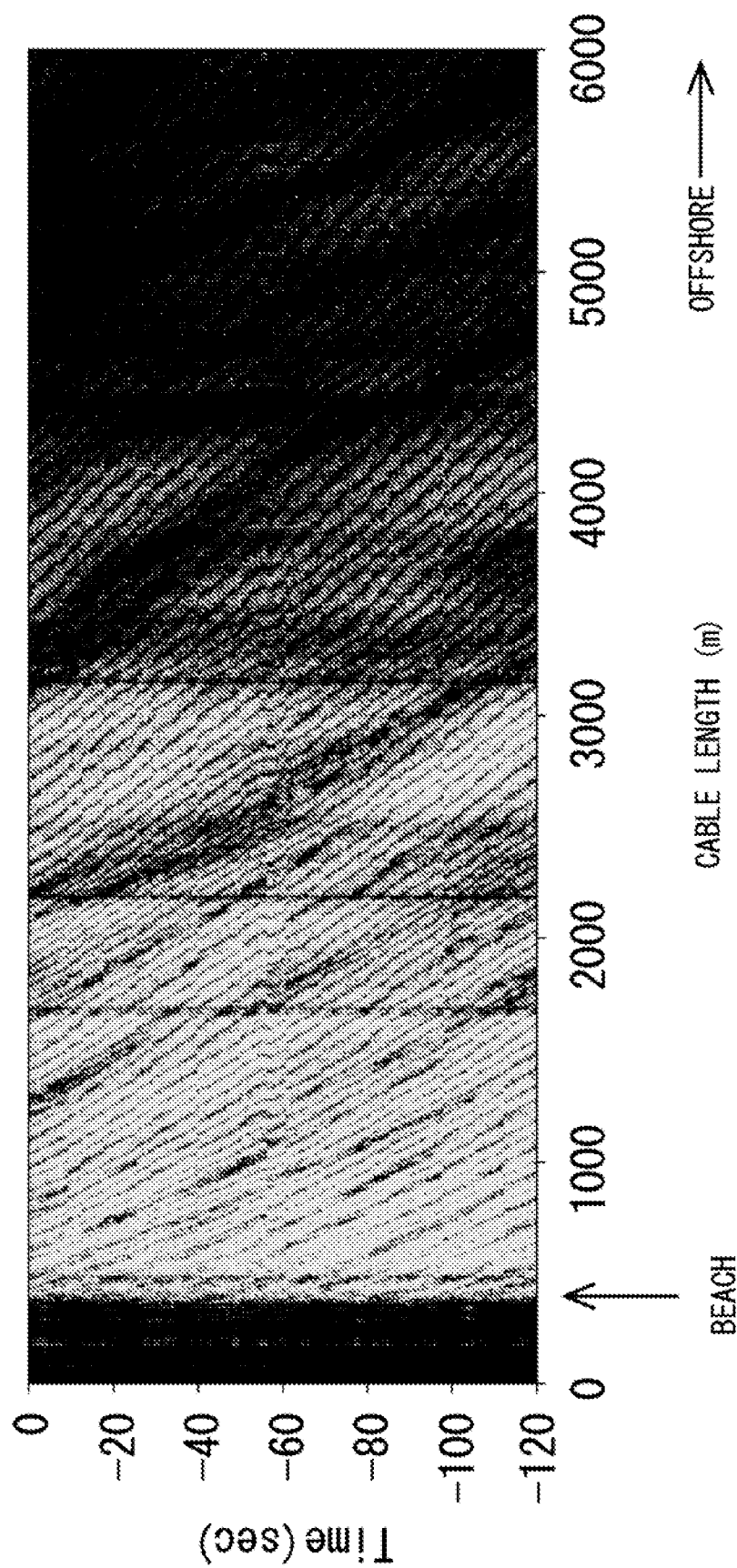
FIG. 10 is a diagram showing an example in which a change in water pressure due to waves is detected.

The same pattern can also be obtained using DVS. FIG. 10 shows a water surface waves detected at the same location and at the same time by using DVS on a different core wire in the same optical fiber cable 10 as in FIG. 8. It can be seen that waves can be detected in the same way by any detection method.

Further, FIG. 9 is a graph obtained by extracting and graphing the change in water pressure at the point where the cable distance in FIG. 8 is 2.6 km and the water depth is about 50 m (not at the same time). In FIG. 9, the horizontal axis indicates the time [sec], and the vertical axis indicates the magnitude of the water pressure. From FIG. 9, it can be read that the period of the water surface waves 2.6 km offshore at this time is about 10 seconds.

As described above, the detection unit 30 can use DAS or DVS to acquire a pattern of Rayleigh scattered light. The Rayleigh scattered light represents a change in longitudinal expansion and contraction at the respective points on the optical fiber 12 due to a change in water pressure. Then, the detection unit 30 can detect the distribution of water pressure and the time variation of water pressure on the outside of the tube 11, based on the acquired Rayleigh scattered light pattern.

Calibration of Sensitivity for Each Cable Installation Location

Looking at FIGS. 8 and 10, some dark streaks can be seen in the vertical direction. This indicates that this part of the optical fiber cable 10 is particularly less susceptible to changes in water pressure, that is, the sensor sensitivity is low. It is empirically known that such variations in sensitivity do not change in a short period of time, but are almost fixed depending on the location. Therefore, it is considered that there is such a sensitivity variation because the circumstance in which the optical fiber cable 10 is in contact with the seafloor or the circumstance in which the optical fiber cable 10 is laid under the seafloor is non-uniform in the longitudinal direction.

Therefore, for example, using waves traveling on the water surface above the optical fiber cable 10 allows acquiring the high and low coefficients of the sensitivity at the respective points on the optical fiber cable 10 and correcting the non-uniformity of the sensitivity.

When an unbroken wave travels on the water surface, the wave does not change its amplitude suddenly and travels while maintaining an almost constant amplitude. When the wave travels above the optical fiber cable 10, how the wave travels appears on the output data and can be tracked. For example, if there is a location where the recorded value suddenly fluctuates in tracking the high part of the wave, it is considered that the sensor sensitivity at that location deviates from other points. It can be considered that the origin of such non-uniformity of sensitivity is, for example, the fluctuation in magnitude of friction of the optical fiber cable 10 with the seafloor. There may be a state in which the optical fiber cable 10 partially lifted from the bottom of the water or may be laid on the surface of the seafloor in a considerably loosened state. This state is unlikely to generate expansion and contraction due to friction between the seafloor ground and the optical fiber cable 10, and is unlikely to transmit the deformation of the seafloor ground to the optical fiber cable 10.

By the way, it is known that, in the region where the water depth is shallower than ½ of the wavelength of a wave, the height (and velocity) of the wave changes according to the water depth. Therefore, in shallow places such as FIGS. 8 and 10 where the water depth gradually changes, the tendency of wave change according to the water depth can be estimated. Then, the estimated change can be excluded as it is not a component due to the non-uniformity of sensitivity due to the cable installation circumstances. In other words, when the wave tracking value deviates from the estimated line and fluctuates and the place where the deviation and fluctuation is generated is fixed, it is preferable to consider that there is a component of the sensitivity non-uniformity due to the cable installation circumstances, which should be corrected.

If a plurality of waves collide with each other depending on the positional relationship between the optical fiber cable 10 and the wave, the waves may be observed such that the height of the waves suddenly change. Therefore, it is preferable that: the detection unit 30 acquire data a plurality of times under a plurality of conditions in which the waves have different traveling directions and ways of ruffle; and the averages thereof be used as the calibration coefficients for the respective points of the optical fiber cable 10.

Further, since the optical fiber cable 10 has a length of several tens of kilometers or several hundreds of kilometers in particular, it is difficult to track only one wave to calibrate the sensitivity of the entire optical fiber cable 10 at one time. Therefore, it is preferable to: overlap the calibration coefficients of the partial sections obtained from a plurality of events to have no discontinuity; and thereby obtain the sensitivity coefficients over the entire optical fiber cable 10.

Figure 11:
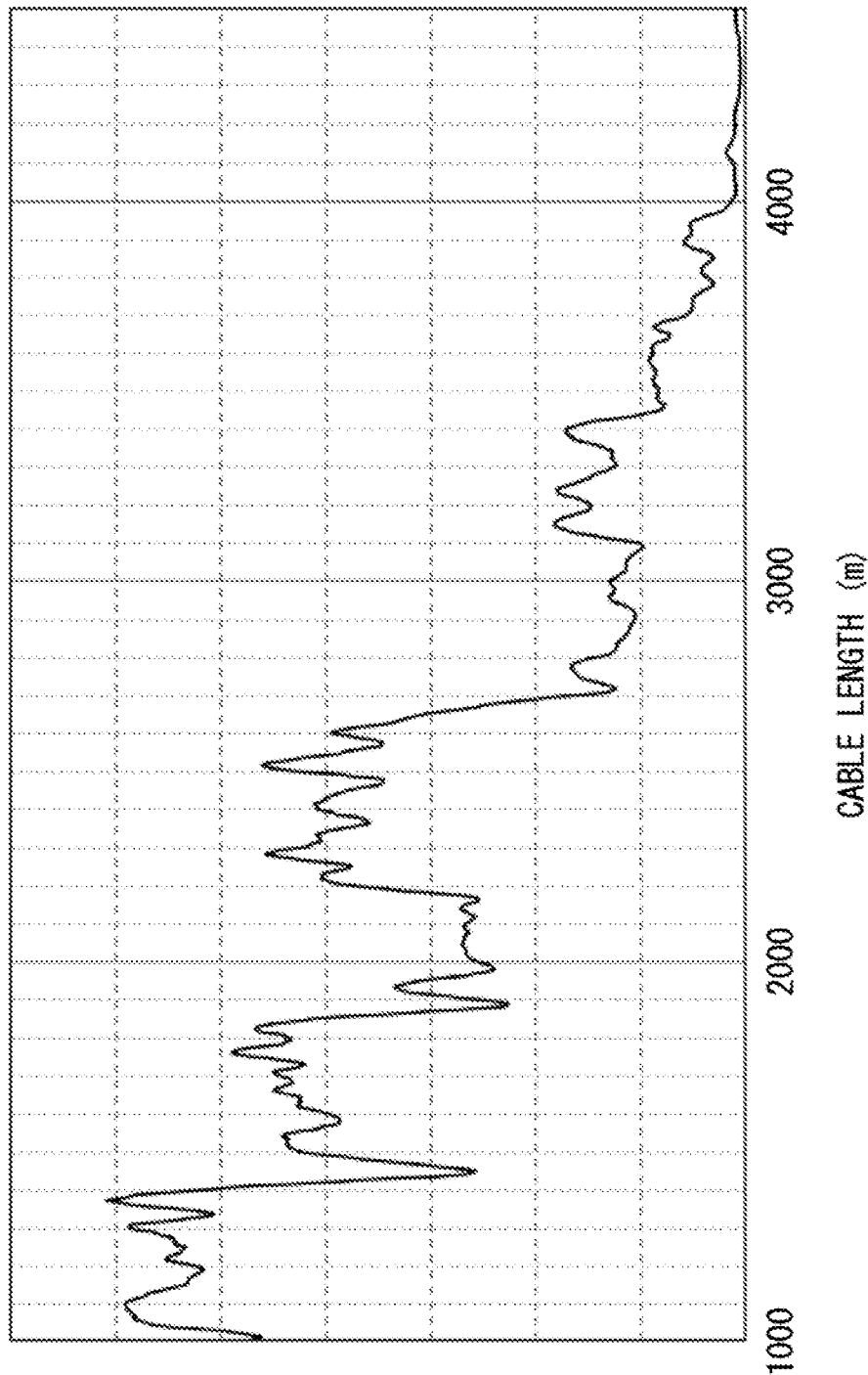
FIG. 11 is an example of a graph representing sensitivity non-uniformity depending on a plurality of points of the cable, obtained by using water surface waves.

FIG. 11 is shown as an example of specific sensitivity non-uniformity. FIG. 11 is a graph showing changes in wave amplitude at the respective points of the cable length by tracking the water surface waves approaching the beach in the same cable section as in FIGS. 8 and 10 in the range of the cable length of 1000 to 4500 m. The water depth in this sea area is approximately proportional to the distance from the beach. In the range of about 3100 to 4000 m in cable length, it appears that the amplitude increases as the water depth becomes shallower.

The section closer to the beach than the section of about 3100-4000 m have a higher sensitivity or a lower sensitivity than the overall tendency. For example, the section of about 2200 to 2600 m is more sensitive than the periphery, and the section of about 2700 to 3100 m is less sensitive than the periphery. In addition, in the section of about 1450 m and the section of about 1900 m, the sensitivity suddenly decreases in a narrow range.

These tendencies are also visible in FIGS. 8 and 10, indicating location-dependent sensitivity non-uniformity. FIG. 11 shows that: at least in this shallow water section, the mechanism in which the deformation of the seafloor ground is transmitted to the cable accounts for a considerable proportion in the mechanism in which the optical fiber cable 10 senses the change in water pressure; and therefore, the state of friction between the optical fiber cable 10 and the seafloor has a non-negligible effect on the sensitivity, and the correction thereof is important.

The reason for the low sensitivity is considered to be that the optical fiber cable 10 is not laid under the seafloor and is only laid on the seafloor with a slack, and such section having the optical fiber cable 10 is less susceptible to the deformation of the seafloor ground.

The reason for the higher sensitivity is considered to be that the water depth in the sensitive section is locally shallower than the overall tendency, or the tension of the optical fiber cable 10 during the burial work remains high. This increase the friction with the surrounding earth and sand, so that the deformation of the seafloor surface is likely to be transmitted to the optical fiber cable 10.

Dividing the measured value by the sensitivity coefficient thus obtained for the respective points of the optical fiber cable 10 allows correcting the non-uniformity of sensitivity depending on the location of the optical fiber cable 10. However, there may be a demand to separately correct the amount that changes according to the water depth, it may be desirable to exclude the amount from the correction coefficient.

In addition, it may be desirable to mark a section where the sensitivity is extremely different from the periphery as a section with low measurement reliability. In the example of FIG. 11, the sensitivity is significantly low in the section of about 1450 m and the section of about 1900 m, and the error would expand if the sensitivity is corrected and enlarged.

For example, when the output of this sensor system is used as information for a tsunami warning system, an unstable and unreliable output value may cause an erroneous warning. Comparing with the reaction of the cable in front and rear allows determining sections having an extremely different output values and instability such as large fluctuations in sensitivity over time, to be sections with low measurement reliability for marking. In addition, a mark indicating that the data has low reliability can be added to the data in that section. These measures can also be performed as part of the sensitivity correction process.

When a section is marked as a section with low measurement reliability but the measured value data at the location therein is really desired, there may be a method of generating interpolation from the data of the section in front and rear.

In FIG. 11, there is not obtained the correction information for the sea area deeper than the sea area with a cable length of 4000 m and a water depth of about 80 m. This is because waves in relatively calm oceanographic phenomena is used. However, larger swells, tides, and small tsunamis may be used. Although it is not easy to artificially generate widespread waves, but such artificial waves may be used.

As described above, there is shown methods of correcting the sensitivity non-uniformity at the respective points on the optical fiber cable 10 by using waves or the like. The following is a summary.

The waves of the change in water pressure at the bottom of the water caused by the wave propagating on the water surface above the optical fiber cable 10 pass through the optical fiber cable 10 in the longitudinal direction. At this time, the measurement data are recorded over a range in which the waves of change in water pressure at the bottom of the water can be observed continuously. Then, from the recorded data, the waves of change in water pressure at the bottom of the water are tracked, and the sensitivity coefficients corresponding to the respective points of the optical fiber cable 10 are calculated.

The step of calculating the sensitivity coefficients is repeated under a plurality of conditions in which the water surface waves above the optical fiber cable 10 have different traveling directions and ways of ruffle. The coefficients of the respective points acquired and obtained a plurality of times are connected so as to minimize mismatching over the entire observation area of the optical fiber cable 10, and are averaged through the plurality of times. Then, the coefficients of the respective points obtained in this way are stored as a sensitivity calibration coefficients for the respective points of the optical fiber cable.

Thereafter, the data of the back scattered light generated at the respective points on the optical fiber cable 10 are divided by the above sensitivity calibration coefficients. Thereby, there is obtained the measured values corrected for the sensitivity non-uniformity at the respective points on the optical fiber cable 10.

This example embodiment illustrates the example of using an unbroken natural wave as a calibration signal. However, the calibration signal can be an artificially generated wave. Alternatively, the calibration signal to be used can be any phenomenon such as a tide or a tsunami, as long as this water pressure sensing system can take the state of the phenomenon in which changes in water pressure propagates to the surroundings.

An earthquake can also be used as a calibration signal. The sensitivity correction coefficient obtained from an earthquake does not always equal the sensitivity correction coefficient for changes in water pressure, but there is a correlation. This is because the sensitivity correction coefficient obtained from an earthquake includes information on the frictional state between the seafloor ground and the optical fiber cable 10 as described above.

As described above, according to this example embodiment, the optical fiber cable 10 includes a long tube 11 and an optical fiber 12 held and passed through the inside of the tube 11. The tube 11 is structured to expand and contract in the longitudinal direction when the water pressure on the outside of the tube 11 changes. Further, the optical fiber cable 10 is in contact with the bottom surface of water with friction. Therefore, when the change in the water pressure at the bottom of the water deforms the bottom surface of water, the tube 11 expands and contracts in the longitudinal direction. When the tube 11 expands and contracts in the longitudinal direction, the expansion and contraction is transmitted to the optical fiber 12.

Therefore, detecting the state of expansion and contraction of the optical fiber 12 in the longitudinal direction allows detecting the change in the water pressure on the outside of the tube 11. At this time, the tube 11 and the optical fiber 12 just need to have the above-described structure, and does not need to use a special component called FBG as in Patent Literature 3, or a special fixing method of (narrowing) swaging as in Patent Literature 4. This allows easy and inexpensive sensing of the change in water pressure using the optical fiber 12.

Further, according to this example embodiment, the water pressure sensing system 100 includes: an optical fiber cable 10; a receiving unit 20 that receives back scattered light generated at the respective points on the optical fiber 12; and a detection unit 30 that detects states of expansion and contraction of the respective points, based on the pattern of back scattered light, on the optical fiber 12 in the longitudinal direction, and thereby detects the distribution of water pressure on the outside of the tube 11 and the time variation of water pressure. This allows detecting the change in water pressure on the outside of the tube 11 in detail, as the distribution of water pressure and the time variation of water pressure.

Further, the detection unit 30 detects the distribution of the water pressure and the time variation of the water pressure on the outside of the tube 11 based on the pattern of the Rayleigh scattered light among the back scattered light. Thus using the Rayleigh scattered light allows detecting the distribution of the water pressure and the time variation of the water pressure on the outside of the tube 11 with higher accuracy than using the Brillouin scattered light.

Other Example Embodiments

In the above-described example embodiment, the detection unit 30 uses the time difference between the time when the receiving unit 20 emits the pulsed light into the optical fiber 12 and the time when the receiving unit 20 receives the back scattered light from the optical fiber 12, and thereby identifies the position on the optical fiber 12 where the back scattered light is generated (the cable length of the optical fiber cable 10 from the receiving unit 20). However, the correspondence between the position represented by the latitude longitude coordinate system and the position on the optical fiber 12 is estimated from the laying route information and has an error.

Therefore, it is preferable to calibrate the relationship between the position on the optical fiber 12 and the actual position. For example, the optical fiber cable 10 is temporarily connected to the receiving unit 20 and the detection unit 30, and then the optical fiber cable 10 is hit or touched to generate vibration or sound in the optical fiber cable 10, so that the position on the optical fiber 12 at that time is identified. Today, the actual position can be accurately located by receiving GNSS (Global Navigation Satellite System) satellite radio waves even at sea. This allows calibrating the correspondence between the identified position on the optical fiber 12 and the actual position. Note that the interval between the points where this calibration is performed does not need to be close along the optical fiber 12. Calibration performed at relatively long intervals also allows obtaining the effect of improving position accuracy.

Further, in the above-described example embodiment, the receiving unit 20 and the detection unit 30 are illustrated in the drawings as independent components. However, they may be provided in one apparatus (optical fiber sensing device) or may be distributed in a plurality of apparatuses.

Hardware Configuration of Optical Fiber Sensing Device

As described above, the receiving unit 20 and the detection unit 30 can be provided in one apparatus (optical fiber sensing device). Then, with reference to FIG. 12, the following describes the hardware configuration of the computer 40 that embodies an optical fiber sensing device including a receiving unit 20 and a detection unit 30.

Figure 12:
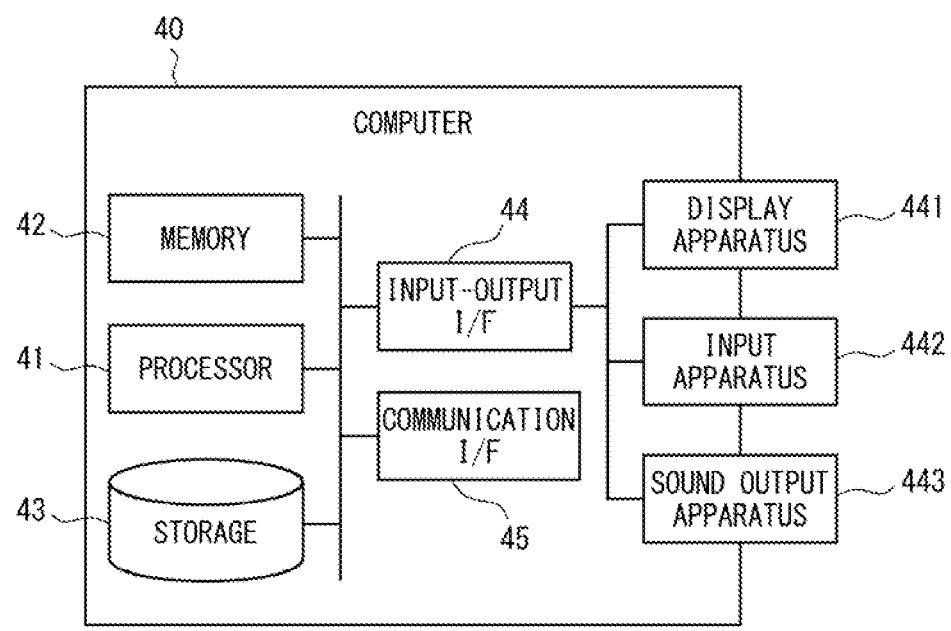
FIG. 12 is a block diagram showing an example of a hardware configuration of a computer that embodies an optical fiber sensing device.

As shown in FIG. 12, the computer 40 includes a processor 41, a memory 42, a storage 43, an input-output interface (input-output I/F) 44, a communication interface (communication I/F) 45. The processor 41, the memory 42, the storage 43, the input-output interface 44, and the communication interface 45 are connected by a data transmission line for transmitting and receiving data to and from each other.

The processor 41 is, for example, an arithmetic processing apparatus such as a CPU (Central Processing Unit) or a GPU (Graphics Processing Unit). The memory 42 is, for example, a memory such as a RAM (Random Access Memory) or a ROM (Read Only Memory). The storage 43 is, for example, a storage apparatus such as a HDD (Hard Disk Drive), an SSD (Solid State Drive), or a memory card. Further, the storage 43 may be a memory such as a RAM or a ROM.

The storage 43 stores a program that realizes the functions of the components (receiving unit 20 and detection unit 30) included in the optical fiber sensing device. The processor 41 executes each of these programs to realize the functions of the components included in the optical fiber sensing device. Here, in executing each of the above programs, the processor 41 may execute these programs after reading the programs onto the memory 42, or may execute the programs without reading them onto the memory 42. Further, the memory 42 and the storage 43 also serve for storing information and data held by the components included in the optical fiber sensing device.

Further, the above-described program can be stored by using various types of non-transitory computer readable medium and supplied to a computer (including a computer 40). Non-transitory computer readable media include various types of tangible storage media. Examples of Non-transitory computer readable media include: magnetic recording media (for example, flexible discs, magnetic tapes, hard disk drives); magneto-optical recording media (for example, magneto-optical discs); CD-ROMs (Compact Disc-ROMs); CD-Rs (CD-Recordables); CD-R/Ws (CD-ReWritables); semiconductor memories (for example, mask ROMs; PROMs (Programmable ROMs); EPROMs (Erasable PROMs); flash ROMs; and RAMs. The program may also be supplied to the computer by various types of transitory computer readable media. Examples of transitory computer readable media include electric signals, light signals, and electromagnetic waves. A transitory computer readable medium can provide a program to a computer via a wired communication path such as an electric wire or optical fiber, or a wireless communication path.

The input-output interface 44 is connected to a display apparatus 441, an input apparatus 442, a sound output apparatus 443, and the like. The display apparatus 441 is an apparatus that displays a screen corresponding to drawing data processed by the processor 41, such as a display or a monitor of an LCD (Liquid Crystal Display) or a CRT (Cathode Ray Tube). The input apparatus 442 is an apparatus that receives an operator's operation input, and is, for example, a keyboard, a mouse, a touch sensor. The display apparatus 441 and the input apparatus 442 may be integrated and embodied as a touch panel. The sound output apparatus 443 is an apparatus such as a speaker that acoustically outputs sound corresponding to acoustic data processed by the processor 41.

The communication interface 45 transmits and receives data to and from an external apparatus. For example, the communication interface 45 communicates with an external apparatus via a wired communication path or a wireless communication path.

Although the above describes the present disclosure with reference to the example embodiments, the present disclosure is not limited to the above-described example embodiments. Various changes that can be understood by those skilled in the art can be made to the configurations and details of the present disclosure within the scope of the present disclosure.

This application claims priority on the basis of Japanese Patent Application No. 2019-191493 filed on Oct. 18, 2019, and incorporates all of its disclosures herein.

REFERENCE SIGNS LIST

10 OPTICAL FIBER CABLE
11 TUBE
12 OPTICAL FIBER
13 FILLER
20 RECEIVING UNIT
30 DETECTION UNIT
40 COMPUTER
41 PROCESSOR
42 MEMORY
43 STORAGE
44 INPUT-OUTPUT INTERFACE
441 DISPLAY APPARATUS
442 INPUT APPARATUS
443 SOUND OUTPUT APPARATUS
45 COMMUNICATION INTERFACE
100 WATER PRESSURE SENSING SYSTEM

What is claimed is:

1. An optical fiber cable comprising:
a tube; and
at least one optical fiber held and passed through an inside of the tube, and laid on or under a seafloor for installation, wherein
a ground of the seafloor is pushed according to a change in water pressure to elastically deform,
the tube is structured to expand and contract in a longitudinal direction according to deformation of the ground of the seafloor due to the change in the water pressure, when the water pressure on an outside of the tube changes, and
the optical fiber is structured to expand and contract in the longitudinal direction according to expansion and contraction of the tube in the longitudinal direction, as imparted from the tube when the tube expands and contracts in the longitudinal direction.

2. The optical fiber cable according to claim 1, wherein the tube is structured to prevent the water pressure on the outside of the tube from directly becoming lateral pressure on the optical fiber.

3. The optical fiber cable according to claim 1, wherein the tube is a tubular structure with an integral structure.

4. The optical fiber cable according to claim 1, wherein the tube is a tubular structure made by combining a plurality of members.

5. The optical fiber cable according to claim 1, wherein the tube is structured to be compressed in the radial direction and at a same time extend in the longitudinal direction as the water pressure on the outside of the tube increases, and the tube is structured to deform and restore as the water pressure decreases.

6. A sensitivity correction method of for the optical fiber cable according to claim 1, the sensitivity correction method comprising:
   for each of a plurality of times under a plurality of conditions in which waves have different traveling directions and ways of ruffling, calculating, from measured value data, sensitivity coefficients at a plurality of points of the optical fiber cable, based on continuity when the waves pass, the waves being waves of change in the water pressure at water bottom or waves of an earthquake propagating on the ground of the seafloor, the change in the water pressure caused by water surface waves above the optical fiber cable, the measured value data recording how the waves pass through the optical fiber cable in the longitudinal direction;
   connecting the sensitivity coefficients obtained at the respective points to minimize mismatching over an entire observation area of the optical fiber cable;
   averaging the sensitivity coefficients obtained the plurality of times, to yield
   sensitivity calibration coefficients for the respective points of the optical fiber cable; and
   in subsequent measurements, dividing the measured values obtained at the respective points on the optical fiber cable by the sensitivity calibration coefficients to correct sensitivity non-uniformity at the respective points on the optical fiber cable.

7. The sensitivity correction method according to claim 6, further comprising:
   identifying a section of the optical fiber cable having low measurement reliability, based on the sensitivity calibration coefficients,
   wherein the measured value data pertaining to the identified section is accordingly marked, the identified section having a sensitivity that is different from surrounding sections and that changes over time.

8. A water pressure sensing system comprising:
   the optical fiber cable according to claim 1; and
   an optical fiber sensing device configured to:
   a emit incident light into optical fiber of the optical fiber cable and receive back scattered light generated at a plurality of points on the optical fiber; and
   detect states of expansion and contraction of the respective points, based on patterns of the back scattered light, on the optical fiber in the longitudinal direction, to detect a distribution of the water pressure and a time variation of the water pressure on the outside of the tube.

9. The water pressure sensing system according to claim 8, wherein the optical fiber sensing device is configured to detect the distribution of the water pressure and a time variation of the water pressure on the outside of the tube based on a pattern of Rayleigh scattered light among the back scattered light.

* * * * *